Figure 1:
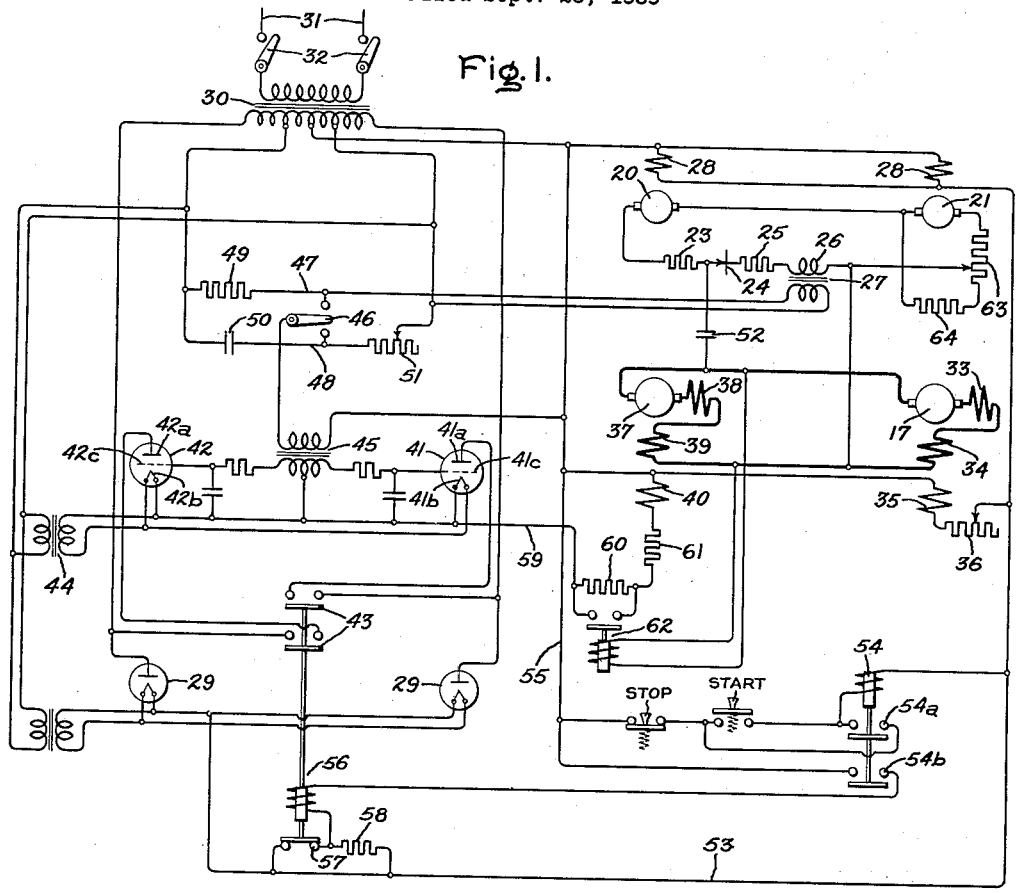

April 8, 1941.　　　　G. W. GARMAN　　　　2,237,985

CONTROL SYSTEM

Filed Sept. 23, 1939

Inventor:
George W. Garman,
by Harry E. Dunham
His Attorney.

Patented Apr. 8, 1941

2,237,985

UNITED STATES PATENT OFFICE 2,237,985

CONTROL SYSTEM

George W. Garman, Schenectady, N. Y., assignor to General Electric Company, a corporation of New York Application September 23, 1939, Serial No. 296,244

3 Claims. (Cl. 172—293)

My invention relates to control systems, more particularly to electrical systems employing electric valves for controlling an electrical characteristic of a dynamo-electric machine, and has for its object the provision of improvements in a system of control of this character.

More specifically my invention relates to systems for controlling the operation of machines operating on a length of material such, for example, as a web of wood veneer, paper, cloth or the like.

In veneer stripping or cutting machines in which veneer is stripped from a log rotated at any desired speed and the resulting strip or web is run out on a motor-driven roll conveyor for cutting into lengths, provision must be made for controlling the linear speed of the web on the conveyor with respect to its linear speed at the point of take-off adjacent the log. This is so since the diameter of the log decreases as veneer is stripped off and therefore the linear speed of the veneer at take-off decreases continuously even though the log be rotated at constant speed. Hence, if the conveyor continues to run at a given speed, undue tensioning and perhaps breakage of the web will occur. In other words, the linear speeds of the web for at least two points along its length must be maintained in approximate synchronism to avoid changes in the length of the web between these points when the speed at one point is variable.

In accordance with my invention, the exciting field circuit of a generator is energized from an alternating current circuit through a pair of electric valves. The generator may supply an electric motor which, in this embodiment of my invention, is the driving motor for the rolls of a conveyor. Speed control of the driving motor is obtained by varying the voltage supplied from the generator. In order to control the output voltage of the generator to effect speed control of the motor, I provide a phase shifting circuit for varying the phase of the grid potential of the electric valves with respect to their anode potentials. The phase shifting circuit includes a saturable core reactor connected in series across the alternating current circuit. Provision is made for energizing the saturating winding of the saturable reactor by a means responsive to a difference in linear speeds of two points along the veneer web.

This means preferably comprises a pair of pilot generators. The first of these pilot generators is mechanically coupled to the veneer web as it leaves the log, i. e., at the point where the linear speed of the web is decreasing due to the decrease in the log diameter as the veneer is stripped off the log. The second pilot generator is coupled to the driving roll of the conveyor which determines the speed of the web on the conveyor. The pilot generators are electrically connected to a common output circuit so that their respective output voltages oppose each other. If the pilot generator voltages vary with respect to each other because of a change in speed of one or the other of the generators, a circulating current proportional to the speed difference and therefore the voltage difference between the pilot generators flows in the saturating winding of the reactor. The resulting change in impedance of the saturable reactor increases or decreases the output of the electric valves to correspondingly increase or decrease the field excitation and output voltage of the main generator supplying the driving motor. Thus, the speed of the conveyor motor is raised or lowered to bring the linear speeds of the portions of the web into substantial synchronism. In addition, a simple anti-hunting circuit is provided to prevent over-correction of the generator voltage output and driving motor speed in a manner more fully described hereinafter.

Figure 2:
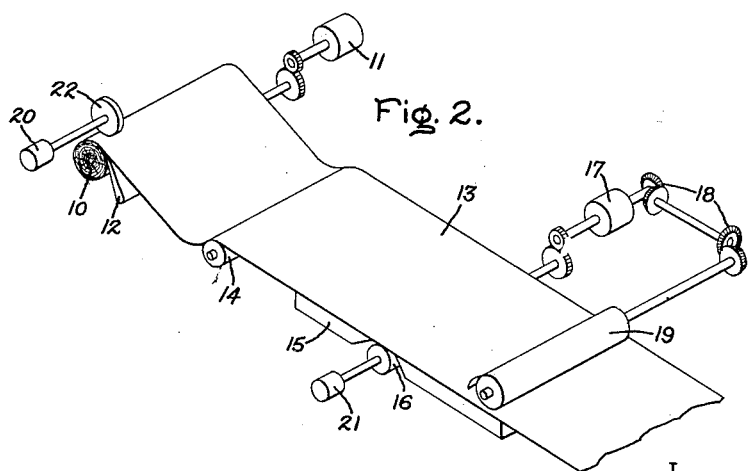

Further objects and advantages of my invention will become apparent from the following specification, and for a better understanding of my invention reference should now be had to the accompanying drawing in which Fig. 1 is a circuit diagram of a control system connected in accordance with my invention; and Fig. 2 is a perspective view of a diagrammatic illustration of veneer stripping and cutting apparatus arranged to be controlled by a system shown in Fig. 1.

Referring now to the drawing, I have illustrated my invention in one form in connection with a veneer stripping, conveying and cutting system as shown in Fig. 2, although, as will become apparent from the description hereinafter, my invention has broad application to the control of dynamo-electric machines. A log 10 is arranged to be driven by a suitable electric motor 11 preferably at constant speed. Veneer is stripped or shaved from the periphery of the log 10 by a suitable knife 12. The veneer web 13 coming from the log is led over a guide roll 14 onto a conveyor bed 15 and is driven lengthwise on the conveyor by a driving roll 16 which itself is driven by a suitable electric driving motor 17. The electric motor 17 is coupled by the gears 18 to a rotary cutter 19 provided for cutting the veneer web into predetermined lengths.

It should now be apparent that even though the motor 11 drives the log at constant speed, the diameter of the log 10 and therefore the linear speed of the web 13 adjacent the point of take-off at the edge of the knife 12 is continuously decreasing during the stripping operation. For this reason the tension on the web will increase gradually if the speed of the web at a point adjacent the driving roll 16 remains constant, such as will occur if the speed of the driving roll remains constant. To overcome this difficulty, I provide a control system which automatically adjusts the speed of the driving motor 17 and the driving roll 16 responsive to a change in the relative linear speeds of a point on the web 13 adjacent the log 10 and another point on the web in contact with the driving roll 16, the speed at the latter point being determined by the peripheral speed of the roll 16. In this manner by automatic adjustment of the speed of the driving motor 17, the linear speeds of spaced points on the web, namely at the log 10 and at the conveyor roll 16, are maintained substantially in synchronism.

In the form of my invention described herein, the condition to be controlled is the relative speeds of the web 13 at the aforementioned points, that is, at the log 10 and at the roll 16. These speeds preferably are converted into electrical voltage magnitudes that can be compared as a difference voltage. The resulting difference voltage is applied to the saturating winding of a saturable core reactor in a manner more fully described hereinbelow. Preferably, a pair of suitable pilot generators, such as the direct-current tachometer generators 20 and 21, are provided. I do not intend, however, to be limited in this respect since other means responsive to a condition to be controlled may be used, as will be understood by those skilled in the art, without departing from the scope of my invention. The pilot generator 20 is mechanically coupled to the web 13 at the log 10 by a friction roller 22, and the pilot generator 21 is directly coupled to the driving roll 16 of the conveyor. As shown in Fig. 1, the pilot generators 20 and 21 have a common output circuit including a serially connected resistance 23, a rectifier 24, a resistance 25, and a saturating winding 26 of a saturable reactor 27, the polarity of the pilot generators being in normal opposition. Each pilot generator is provided with a suitable separately excited field winding 28, these windings being connected in parallel and supplied with direct current from a pair of suitable rectifiers, such as the two electrode rectifier valves 29, connected to the secondary of an alternating current supply transformer 30. The primary winding of the supply transformer 30 is energized from a suitable source 31 of single phase alternating current through the switches 32.

The conveyor motor 17 is preferably a direct-current motor having a series connected commutating field winding 33 and a series field winding 34. A separately energized exciting winding 35 is also provided for the motor 17 and is connected in parallel with the field windings 28 of the pilot generators 20 and 21. The excitation of the field winding 35 and thereby the speed of the motor 17 is independently adjustable by means of a variable resistance 36 connected in series with the exciting field winding 35.

A suitable direct-current generator 37 having a series connected commutating field winding 38 and a series field winding 39 is arranged to supply the conveyor motor 17. In addition a separately excited field winding 40 is provided to vary the output voltage of the generator and thereby vary the speed of the motor 17 in this system which is of the Ward Leonard type. The main generator 37 is, of course, driven by suitable driving means (not shown).

In order to supply the exciting winding 40 of the generator 37 with direct current of the proper magnitude to maintain the output voltage of this generator and thereby the speed of the motor 17 at the correct value relative to the speed of the motor 11, I provide supply and control circuits as follows: The excitation is derived from the source of alternating current 31 through the supply transformer 30. The secondary winding of the transformer 30 has its ends connected respectively to the anodes 41a and 42a of a pair of suitable electric valve devices 41 and 42 through the respective switches 43. The electric valves 41 and 42 are provided respectively with the anodes 41a and 42a, the cathodes 41b and 42b, and the control grids 41c and 42c and may be of any of the several types well known in the art, although I prefer to use valves of the vapor electric discharge type in which the starting of current in the valve is determined by the potential on the control grid, but in which the current through the valve can be interrupted only by reducing its anode potential below the critical value. The cathodes 41b and 42b of the valves are connected to a heating source through any suitable means, such as a transformer 44 having its primary connected across a portion of the secondary of the supply transformer 30. The control grids 41c and 42c are connected to the secondary of a transformer 45 having its primary connected at one side to an electrical midpoint of the secondary of the transformer 30. The other side of this primary may be connected through a double throw switch 46 to either of a pair of phase shifting circuits 47 and 48. The phase shifting circuit 47 includes the series connected resistance 49 and saturable core reactor 27 which are connected across a portion of the secondary of the transformer 30. Similarly, the phase shifting circuit 48 includes the series connected capacitance 50 and variable resistance 51 connected across the same portion of the secondary of the transformer 30. Thus, in a well-known manner, a potential may be applied to the grids 41c and 42c having a definite phase relation to the anode potentials of the valves 41 and 42 to render these valves conducting for predetermined portions of the positive half cycles of the anode potentials.

Through the switch 46, a choice may be made between the phase shifting circuits 47 and 48. If the switch is moved downwardly to connect the circuit 48, grid potentials having a predetermined phase relation to the anode potentials are applied and the valves 41 and 42 will conduct a predetermined current. If the circuit 47 is connected, grid potentials having a phase relation which varies with the impedance of the saturable core reactor 27 are applied and the valves 41 and 42 conduct a current whose magnitude is related to the impedance of the saturable reactor 27. Since the impedance of the reactor 27 varies in response to the difference voltage of the pilot generators 20 and 21, voltage control of the generator 37 and thereby speed control of the motor 17 is obtained, as more fully described below.

Because of the time lag inherent in a control system of this character, there is a tendency, when once the web speeds fall out of synchronism, for over-correction of the impedance of the saturable reactor 27 to occur. This over-correction is due to the fact that the opposing voltage of the pilot generator 21 does not assume its new or corrected value until the motor 17 has picked up or slowed down to the proper corrected speed. Thus, a certain amount of hunting may result before the final speed correction is completed. To prevent such hunting or over-control of the generator 37 in response to the difference voltage of the pilot generators 20 and 21, I provide a simple anti-hunting means including a condenser 52 connected in parallel with the rectifier 24, the resistance 25 and the saturating winding 26 of the reactor 27, this parallel circuit being made through the generator 37 so that the generator 37 is connected in series with the condenser 52. As will be more fully explained hereinafter, the condenser 52 is charged in accordance with the output voltage of the generator 37 and is arranged to assist or oppose the difference voltage of the pilot generators 20 and 21 in a manner tending to increase or limit the current flow in the saturating winding 26 of the reactor 27 in response to voltage changes of the generator 37.

With the foregoing understanding of the elements and their organization in the completed system, the operation of the system itself will readily be understood from the following detailed description.

The system is energized by closing the line switches 32. Immediately a direct current flows in a circuit from the outer ends of the secondary of the transformer 30 through the rectifiers 29, their common output conductor 53, the field windings 28 of the pilot generators 20 and 21 and back to the midpoint of the secondary of the transformer 30. Assuming the generator 37 to be driven by its driving means (not shown), the switch 46 is moved to its lower position to connect the grids 41c and 42c with the phase shifting circuit 48 which shifts by a fixed amount, relative to the anode potentials of the valves 41 and 42, the phase of the potential applied to the grids 41c and 42c, the extent of the phase shift being variable by the variable resistance 51. The "start" button is then pressed for operating a contactor 54, the energizing winding of which is connected in parallel with the field windings 28 through the "start" button, a "stop" button and a conductor 55. Closure of the upper contacts 54a serves to seal the contactor closed, and the closure of the lower contacts 54b simultaneously completes an energizing circuit for the winding of a contactor 56. This latter energizing circuit may be traced from the conductor 53 through the contacts 57 and, when the contacts 57 are opened thereafter through a resistor 58, the energizing winding of the contactor 56, the contacts 54b and through the conductor 55 to the secondary of the transformer 30. Operation of the contactor 56 closes the anode switches 43 for connecting the valves 41 and 42 to the transformer 30. The valves 41 and 42 now become conducting and supply a predetermined current to the exciting winding 40 of the generator 37 through a common output conductor 59 and the series resistors 60 and 61. Accordingly, the voltage output of the generator 37 builds up until sufficient to operate a relay 62 for shorting out the resistor 60 and permitting a further increase in generated output voltage, the resistor 60 being provided to limit the excitation applied to the exciting winding 40 until the output voltage of the generator 37 exceeds a predetermined value. The driving motor 17 for the conveyor roll then operates at a speed proportional to the voltage supplied from the generator 37.

Now the motor 11 is started up and the cutting knife 12 positioned to strip veneer from the rotating log 10. As soon as the veneer is fed to the conveyor roll 16, it is pulled forward at a speed determined by the speed of the driving motor 17. During this initial period, the speed of the motor 17 is adjusted either directly through its variable field resistor 36 or through the variable resistor 51 in the phase shifting circuit 48. After all adjustments have been made and the speed of the web 13 at the take-off point approximates its speed on the conveyor 15, automatic control is instituted by moving the switch 46 from its lower position to its upper position to connect the phase shifting circuit 47 for supplying the grids 41c and 42c from this circuit through the transformer 45.

By means of the limiting resistors 63 and 64 connected in series with the pilot generator 21 and in parallel with the common output circuit of both of the pilot generators, the resistor 63 being a variable resistance having a portion common to both of these circuits, the voltage of the pilot generator 21 which is applied to the common output circuit is normally maintained at a lower value than the opposing output voltage of the pilot generator 20 so that a circulating current flows in this common output circuit and through the saturating winding 26 of the saturable reactor 27. The circulating current varies from a zero value to a magnitude sufficient to saturate the reactor 27. The impedance of the saturable reactor 27 is variable in response to changes in the difference voltage of the pilot generators, since this difference voltage determines the magnitude of the circulating current tending to saturate the reactor 27. The unidirectional characteristics of the rectifier 24 included in the common output circuit enables the reactor 27 to differentiate between currents of different polarity which may tend to flow through it, depending upon whether the voltage of the pilot generator 20 should become less or greater than that of the pilot generator 21. This discrimination is necessary since a saturable reactor is unaffected by the polarity of the saturating current. Thus the reactor 27 is responsive to and can differentiate between changes in the relative web speeds and also the direction of such change. The rectifier 24 also serves to prevent a complete reversal of polarity of the saturating current and thereby the possibility of loss of control. The resistor 23 serves to load the otherwise low resistance armature circuits of these opposed generators and also to increase the time constant of this circuit to prevent the condenser 52 from discharging through these armatures.

Assuming now that the motors 11 and 17 are each driving the respective points of the web 13 at the same linear speed, it is apparent that the pilot generators 20 and 21 are generating predetermined voltages. The difference voltage applied to the common output circuit causes a predetermined circulating current to flow in the saturating winding 26 in the direction of normal conduction of rectifier 24. For this value of current, the impedance of the reactor 27 assumes a certain value which determines the extent of the phase shift of the grid potentials with respect to the anode potentials of the values 41 and 42. Thereby the valves 41 and 42 conduct a predetermined current to the exciting winding 40 of the main generator 37 and the speed of the motor 17 remains at the value determined by the output voltage of the generator 37.

During normal operation, the linear speed of the web 13 at the log 10 is continuously decreasing and therefore the speed and voltage of the pilot generator 20 drops off. Likewise, the resulting voltage difference between the pilot generators 20 and 21 tends to decrease so that less circulating current flows in the saturating winding 26, and the reactor 27 has a greater impedance. Increased impedance in the phase shifting circuit 47 retards the phase of the grid potentials and decreases the current output of the valves 41 and 42 to the exciting winding 40 of the generator 37. The decreased output voltage of the generator 37 causes a corresponding decrease in speed of the motor 17 tending to return the web speed at the roll 16 into synchronism with its speed at take-off. Thus, the pilot generator 21 slows down and the voltage difference tends to increase and maintain the proper value of circulating current in the saturating winding 26.

Should for some reason the speed of the pilot generator 20 increase with respect to that of the pilot generator 21, the increased voltage difference will increase the circulating current in the common output circuit, decrease the impedance of the reactor 27, advance the phase of the grid excitation of the valves 41 and 42, increase the output of these valves and thereby increase the excitation and voltage output of the generator 37. This, in turn, increases the speed of the motor 17 and the pilot generator 21 until the web speed on the conveyor is brought substantially up to its take-off speed and the circulating current is brought to the proper value by a decrease in the pilot generator voltage difference. Of course, the web speeds are never exactly in synchronism except for one given speed. The speed difference is small for practical purposes and depends upon the voltage difference between the pilot generators necessary to completely saturate the reactor 27.

The generally undesirable initial over-correction of the impedance of the reactor 27 which causes hunting of the system is obviated by the anti-hunting circuit including the capacitance 52 in the following manner. Assuming that the pilot generator 20 has lost speed relative to the speed of the pilot generator 21, as is normally the case, the decrease in output voltage difference of the pilot generators immediately tends to reduce the circulating current and thereby increase the impedance of the reactor 27 by an amount greater than the final corrected value when the speed and voltage of the pilot generator 21 also are reduced and the correction completed. As seen in Fig. 1, the capacitance 52 is connected to the output circuit of the generator 37 and during stable conditions is charged to a potential value approximately proportional to the terminal potential of the generator 37. When, as in this illustration, the potential of the generator 37 tends to fall off due to the decreased excitation of the exciting winding 40 from the valves 41 and 42 because of the increasing impedance of the reactor 27, the polarity of the capacitance 52 is such that it tends to aid the difference voltage of the pilot generators in maintaining the circulating current flow and thereby keeping the impedance of the reactor 27 down until the voltage difference of the pilot generators again tends to increase as the motor 17 and pilot generator 21 lose speed. If the time constants of this capacitance shunt circuit are properly chosen with respect to the inherent time lag of the system due to the main generator field, the inductance of the generator and motor circuits, and the mechanical inertia of the system, the undesirable hunting characteristics may be substantially compensated.

Likewise, if the voltage difference of the pilot generators 20 and 21 increases so that an increase in the voltage output of the generator 37 and the speed of the motor 17 is called for, the potential of the generator 37 tends to exceed the potential of the capacitance 52. The relatively reduced potential of the capacitance 52 as against the increased potential at the terminals of the generator 37 tends to oppose the increase in circulating current caused by the increased voltage difference of the pilot generators. This temporary opposition of the capacitance 52 holds down the rapid increase in circulating current that would over-correct the impedance value of the reactor 27, until the motor 17 and pilot generator 21 gain speed and thereby reduce the voltage difference of the pilot generators.

While I have shown a particular embodiment of my invention, it will be understood, of course, that I do not wish to be limited thereto since many modifications may be made, and I therefore contemplate by the appended claims to cover any such modifications as fall within the true spirit and scope of my invention.

What I claim as new and desire to secure by Letters Patent of the United States is:

1. A system of control for controlling the speed of an electric motor with respect to a reference speed comprising in combination, means for supplying a potential to operate said motor, an alternating current circuit, means energized from said alternating current circuit for varying the potential of said motor supply means including an electric valve provided with an anode, a cathode, and a control grid, means including a variable reactor for controlling the conductivity of said valve, means for varying the impedance of said reactor including a pair of pilot D. C. generators connected in voltage opposition and driven respectively at speeds proportional to the speed of said motor and to said reference speed, a saturating winding for said reactor connected to receive a current circulated by the D. C. difference voltage of said pilot generators whereby the potential of said motor supply means is varied to control the speed of said motor, and current rectifying means connected in series circuit with said saturating winding for preventing a reversal of current in said saturating winding thereby to prevent false operation of said motor supply means in response to a reversal of the polarity of said D. C. difference voltage.

2. A system of control for controlling the speed of a direct current motor with respect to a reference speed comprising in combination, a direct current generator provided with field and armature windings, circuit connections for supplying the output of said generator to said motor, an alternating current circuit, means for energizing one of said windings of said generator from said alternating current circuit including an electric valve provided with an anode, a cathode, and a control grid, a circuit for producing dephased potentials including a variable reactor serially connected across said alternating current circuit, circuit connections for impressing upon said control grid a potential derived from said series circuit, means including a pilot D. C. generator driven at a speed proportional to the speed of said motor, another pilot D. C. generator driven at a speed proportional to said reference speed, a common output circuit for connecting said pilot generators in voltage opposition and a saturating winding in said output circuit for receiving a D. C. difference voltage from said pilot generators for varying the impedance of said reactor responsive to the relative speeds of said motor and said reference speed, and a rectifier in said common output circuit for preventing a reversal of current through said saturating winding thereby to prevent false operation of said supply generator in response to a reversal of the polarity of said D. C. difference voltage.

3. A system of control for controlling the speed of a direct current motor with respect to a reference speed comprising in combination, a direct current generator provided with field and armature windings, circuit connections for supplying the output of said generator to said motor, an alternating current circuit, means for energizing one of said windings of said generator from said alternating current circuit including an electric valve provided with an anode, a cathode and a control grid, a circuit for producing dephased potentials including a variable reactor serially connected across said alternating current circuit, circuit connections for impressing upon said control grid a potential derived from said series circuit, means including a pilot generator driven at a speed proportional to the speed of said motor, another pilot generator driven at a speed proportional to said reference speed, a common output circuit for connecting said pilot generators in voltage opposition and a saturating winding in said output circuit for receiving a difference voltage from said pilot generators for varying the impedance of said reactor responsive to the relative speeds of said motor and said reference speed, a rectifier in said common output circuit for preventing a reversal of current through said saturating winding, and a series circuit including a capacitance and said direct current generator, said series circuit being connected in parallel with said rectifier and said saturating winding for modifying the flow of current in said saturating winding.

GEORGE W. GARMAN.